United States Patent [19]

Ofek et al.

[11] Patent Number: 5,245,609
[45] Date of Patent: Sep. 14, 1993

[54] COMMUNICATION NETWORK AND A METHOD OF REGULATING THE TRANSMISSION OF DATA PACKETS IN A COMMUNICATION NETWORK

[75] Inventors: Yoram Ofek, Riverdale; Marcel M. Yung, New York, both of N.Y.

[73] Assignee: International Business Machines Corporation, Armonk, N.Y.

[21] Appl. No.: 647,767

[22] Filed: Jan. 30, 1991

[51] Int. Cl.⁵ .............................................. H04L 12/40
[52] U.S. Cl. ................................ 370/94.3; 340/825.02
[58] Field of Search ......................... 370/93.4, 825.02

[56] References Cited

U.S. PATENT DOCUMENTS

| | | | |
|---|---|---|---|
| 4,320,500 | 3/1982 | Barberis et al. | 370/60 |
| 4,347,498 | 8/1982 | Lee et al. | 340/825.02 |
| 4,395,753 | 7/1983 | Comfort et al. | 364/200 |
| 4,412,285 | 10/1983 | Neches | 364/200 |
| 4,445,171 | 4/1984 | Neches | 364/200 |
| 4,700,344 | 10/1987 | Kaino | 370/94.3 |
| 4,701,756 | 10/1987 | Burr | 340/825.02 |
| 4,814,979 | 3/1989 | Neches | 364/200 |
| 4,868,814 | 9/1989 | Berkovich et al. | 370/67 |
| 4,885,742 | 12/1989 | Yano | 370/85.2 |
| 4,901,311 | 2/1990 | Tanaka | 370/85.1 |
| 4,926,418 | 5/1990 | Cidon et al. | 370/85.5 |
| 4,956,772 | 9/1990 | Neches | 364/200 |
| 5,018,139 | 5/1991 | Despres | 370/94.3 |

FOREIGN PATENT DOCUMENTS 0366433 5/1990 European Pat. Off.

Primary Examiner—Douglas W. Olms
Assistant Examiner—Russell W. Blum
Attorney, Agent, or Firm—Scully, Scott, Murphy & Presser

[57] ABSTRACT

A two-phase fairness algorithm for regulating the transmission of data packets in a communication network having a multitude of nodes connected together to form a spanning tree. In a first or broadcast phase of the fairness algorithm, a first control signal is transmitted over the spanning tree from a root node or a root edge of the tree. This first control signal indicates to each node of the tree a first number of data packets that the node is permitted to transmit in a corresponding time interval. Each intermediate node of the tree transmits the first signal to each of its children nodes only when one or more various conditions relating to the transmission of data packets are satisfied. In a second or merge phase of the fairness algorithm, a second control signal is transmitted from the leaves of the tree to the root node or root edge of the tree. Each intermediate node of the tree transmits the second signal to its parent node only after receiving the second signal from all of its children nodes and after one or more various conditions relating to the transmission of data packets from the intermediate node to its parent node are satisfied. After the root node or root edge of the tree receives the second signal from all of its or their children nodes, the algorithm is repeated.

16 Claims, 13 Drawing Sheets

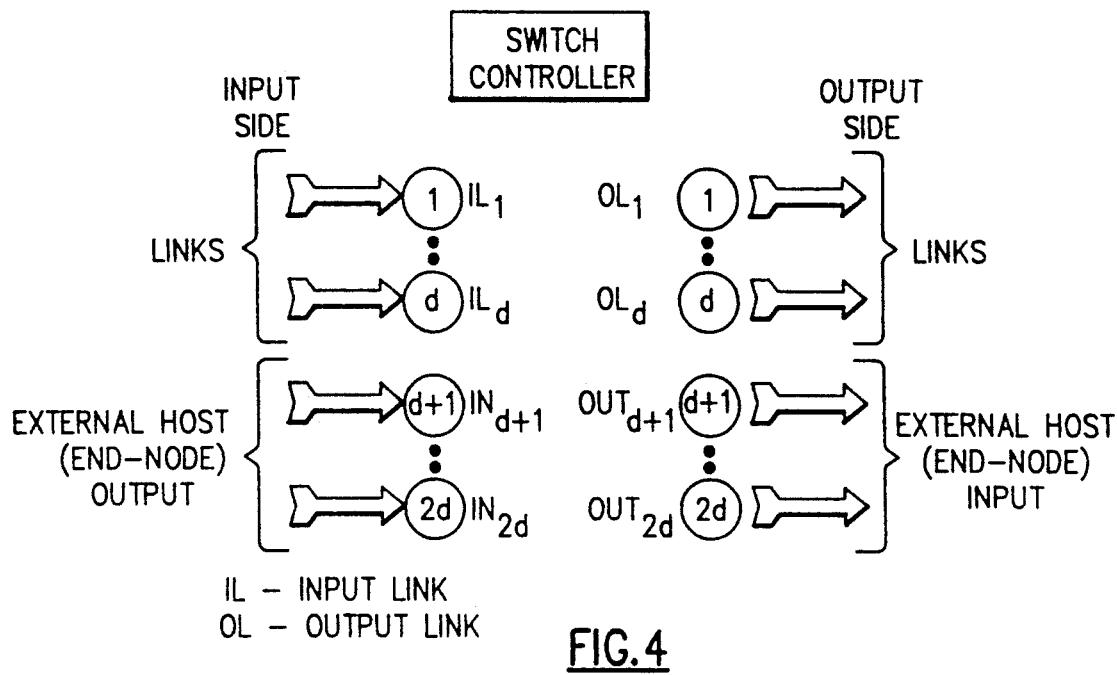
IL – INPUT LINK
OL – OUTPUT LINK
FIG.4
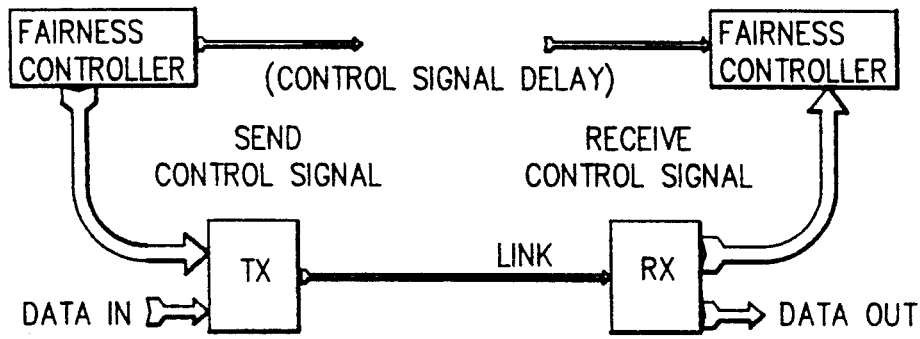
FIG.5
PACKET WITH NO CONTROL SIGNAL
| HEADER | DATA | | DATA | END OF PACKET |
|---|---|---|---|---|
FIG.6
PACKET WITH A CONTROL SIGNAL
| HEADER | DATA | | CONTROL SIGNAL | | DATA | END OF PACKET |
|---|---|---|---|---|---|---|
FIG.7

COMMUNICATION NETWORK AND A METHOD OF REGULATING THE TRANSMISSION OF DATA PACKETS IN A COMMUNICATION NETWORK

BACKGROUND OF THE INVENTION

This invention generally relates to communication networks, and more specifically, to providing each node of a multi-node communication network with fair access to the network. Even more specifically, the invention relates to transmitting control signals over a multi-node communication network and which control the access that each node has to that network.

In large multi-node communication networks, typically, the access that each node has to the network is controlled by signals that are transmitted around the network; and for example, the control signals may give each node a predetermined amount of time to access the network, or allow each node to transmit a predetermined number of data packets into the network. Conventional access control schemes have not been specifically designed for use with high-speed communication networks, which is a new environment, motivated largely by advances in fiber optics technology. Such networks cannot operate optimally under conditions that may cause deadlocks or that may starve certain nodes. This is because these phenomena may require nodes to wait for long periods of time before being given access to the network, or may require the repeated invocation of various recovery procedures that decrease the speed at which the network operates.

SUMMARY OF THE INVENTION

An object of this invention is to provide a fairness algorithm, which controls the transmission of access control signals around a communication network, and that is very well suited for use with a high-speed network.

A further object of the present invention is to provide a built-in fairness mechanism for controlling access to a communication network, and that is fault-tolerant and self-stabilized, and which insures that all nodes of the network have equal opportunity to transmit packets into the network over their adjacent links.

Still another objection of this invention is to provide a fairness mechanism for regulating access to a communication network, that can be used for global rate control and that insures that the rate at which all nodes access the network will increase or decrease proportionally.

Another object of the present invention is to imbed a flow-control mechanism in a communication network interface, which, together with a fairness property, insures that deadlocks will not occur in the network.

These and other objectives are attained with a two-phase fairness algorithm for regulating the transmission of data packets in a communication network having a multitude of nodes connected together to form a spanning tree. In a first, or broadcast, phase of the fairness algorithm, a first control signal, referred to as a SAT-BRD signal, is transmitted over the spanning tree from a root node or a root edge of the tree. This first control signal indicates to each node of the tree a first number of data packets that the node is permitted to transmit in a corresponding time interval. Each intermediate node of the tree transmits the SAT-BRD signal to each of its children nodes only when one or more of various conditions relating to the transmission of data packets are satisfied.

In a second, or merge, phase of the fairness algorithm, a second control signal, referred to as a SAT-MRG signal, is transmitted from the leaves of the tree to the root node or root edge of the tree. Each intermediate node of the tree transmits the SAT-MRG signal to its parent node only after receiving the SAT-MRG signal from all of its children nodes and after one or more various conditions relating to the transmission of data packets from the intermediate node to its parent node are satisfied. After the root node or root edge of the tree receives SAT-MRG signals from all of its or their children nodes, the algorithm is repeated. Preferably, each node of the tree is capable of starting the fairness algorithm, and in particular, the broadcast phase of the algorithm; and each node will start a broadcast phase over the whole tree or a part thereof upon the occurrence of various events.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4 is a diagram showing the functions of the switch controllers of the nodes of the network.

FIG. 5 generally illustrates the manner in which control packets may be transmitted between nodes of the network of FIG. 1.

FIGS. 6 and 7 schematically illustrate data packets that may be transmitted over the network of FIG. 1, with the packet of FIG. 7 also including a control signal.

DETAILED DESCRIPTION OF THE PREFERRED EMBODIMENTS

Figure 1:
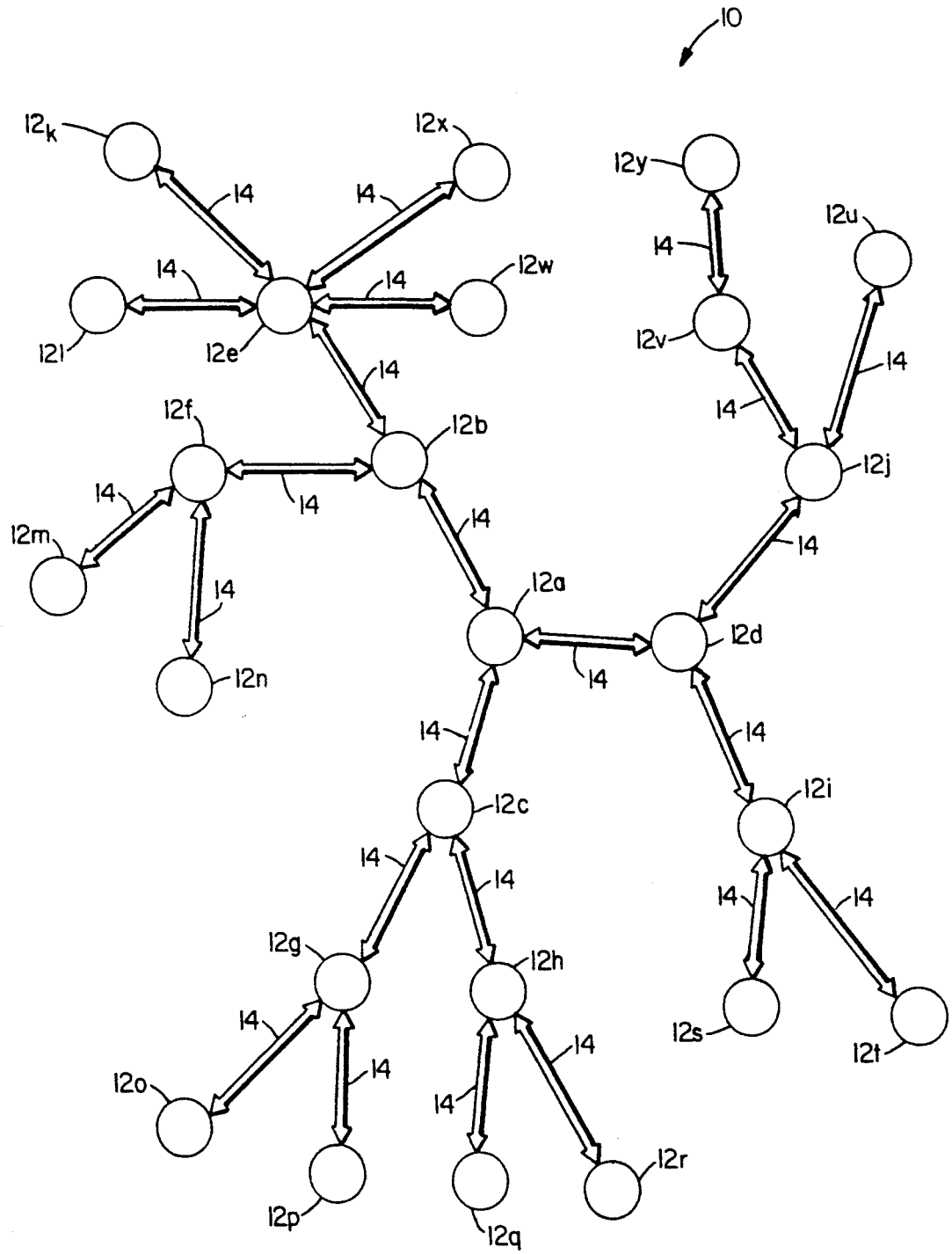
FIG. 1 is a schematic illustration of a full-duplex communication network incorporating the present FIG. 2 schematically illustrates the basic structure of the nodes of the communication network.

FIG. 1 illustrates a spanning tree that is part of a communication network 10, comprising a multitude of nodes 12a–12y and a multitude of links 14. Generally, the nodes of the network provide access to the network for users; and more specifically, each node is connected to a respective one user to transmit data packets between that user and the network. The communication links of the network interconnect the nodes of the network and transmit data packets and other signals between those nodes, and each link of the network connects together two neighboring nodes. Preferably, each link 14 of network 10, in fact, comprises a pair of unidirectional links or link segments; and each such pair of links can be realized by a single communication medium, such as an optical fiber, or by two separate communication mediums, such as a pair of coaxial cables or optical fibers.

The links 14 of network 10 connect the nodes thereof together in a structure referred to as a spanning tree, in which the links can be considered as extending outward from one node, referred to as the root node. The outermost nodes of the spanning tree are referred to as leaf nodes, and the nodes between the leaf nodes and the root nodes are referred to as intermediate nodes. It should be noted that, in the structure of network 10, any one of a group of nodes 12a-12d can be readily considered as the root node of the tree, and the connections or links between this group of nodes are referred to as root edges of the tree structure. Moreover, in an even more general sense, any of the nodes of network 10 can be considered as the root node of the tree structure. It should also be noted that network 10 may include a multitude of additional links that are not part of the spanning tree; however, for the sake of simplicity, these additional links are not shown in the Figures.

In a tree structure, the root node is referred to as the parent or the parent node of all the nodes directly connected to the root node, and all of those nodes directly connected to the root node are referred to as children or children nodes of the root node. Also, in an outward progression along the tree structure, each node that is directly connected to and outward of another node is referred to as the child or child node of the latter node, and that latter node is referred to as the parent or parent node of the former node. Thus, for instance, with the tree structure shown in FIG. 1, node 12a is the parent of nodes 12b, 12c, and 12d; node 12e is the parent of nodes 12k, 121, 12w, and 12x; and nodes 12s and 12t are each children of node 12i.

Figure 2:
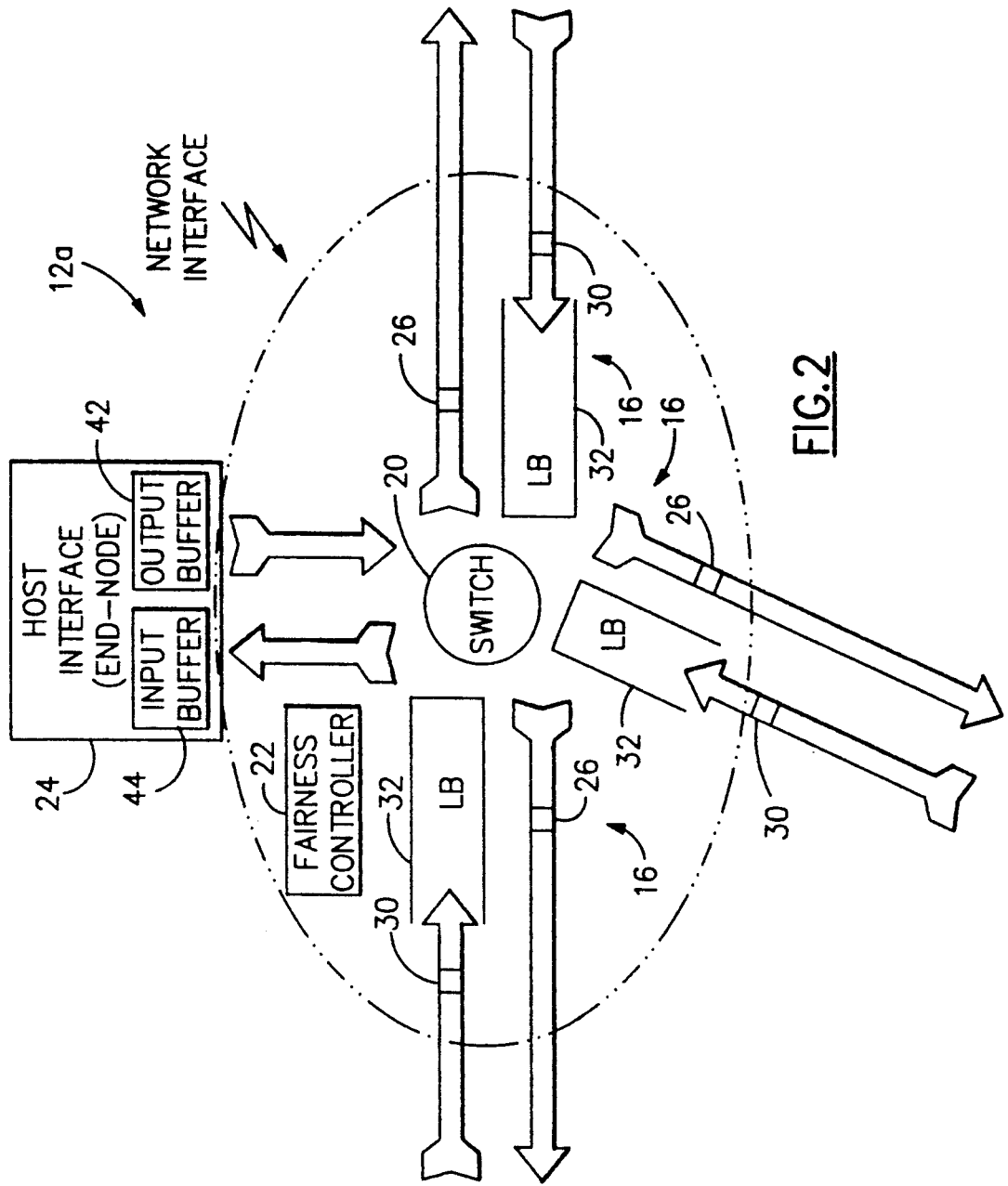
Figure 3:
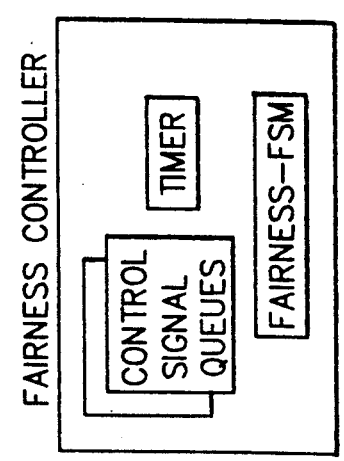
FIG. 3 is a block diagram showing the components of the fairness controller of the node shown in FIG. 2.

The nodes of network 10 are substantially identical, and thus only one will be described herein in detail. FIG. 2 shows node 12a in greater detail; and with reference to this Figure, each node includes one or more full-duplex ports 16, a switch 20, a fairness controller 22 and a host interface 24. Each port is connected to a respective one full-duplex link. On the output or transmitting side of each link, there is a transmitter 26; and on the input or receiving side of each of the links, there is receiver 30 and a link buffer 32 which can store one maximum size data packet. The switch 20 is part of the network interface and it can transfer data packets from the link buffers to the host interface or to the outgoing links, and the switch can transfer data packets from the host interface to the outgoing links. The fairness controller 22 is provided to implement the fairness algorithm, discussed below in detail; and, with reference to FIG. 3, each fairness controller preferably includes a processor 34, a timer 36 and a plurality of control signal queues 40.

The host interface, as shown in FIG. 2, connects the network interface with the outside world, which is referred to as the end-node, and the host interface includes one or more output buffers 42 and one or more input buffers 44. The output buffers are provided to receive and hold data packets to be transmitted to or entered into the network from the end node, and the input buffers are provided to receive and hold data packets to be transmitted to the end node from the network. When the node has a data packet to transmit to or enter into the network, the node puts that packet in the output buffer and then determines over which output link the packet should be sent. If that output link is available, the data packet is then sent to that link via the node switch. When a data packet being transmitted over the network arrives at a node that is the final destination node for that packet, the packet is then sent to the input buffer of the host interface of the node via the node switch.

FIG. 4 illustrates the functions performed by the node switch; and with reference to this Figure, preferably the switch has the following attributes. First, an output link can receive only one data packet at a time. As a result of this, if a first data packet is being transmitted to a particular output link and a second data packet arrives at the node for transmission to that particular output link, then that second data packet will be stored in a buffer until the transmission of the first data packet over the particular output link is completed. For example, if this second data packet is transmitted to the node over one of the input links to the node, that data packet is stored in a link buffer of that input link.

Second, if a data packet arrives at a node for transmission over a particular output link while no other data packet is currently being transmitted over that link —that is, the link is not busy or is idle—the node will begin to transmit the arriving data packet over that output link before the entire data packet has arrived at the node; i.e., the packet will "cut-through" the switch from the input link to the output link. Third, the switch can simultaneously forward multiple data packets to the host interface, specifically the input buffer thereof, and the host interface is able to send simultaneously several data packets from the output buffer of the host interface to different output links via the switch. Fourth, preferably, the size or amount of data that can be transmitted through the switch at any one time is greater than the sum of the sizes or amounts of data which the individual input links of the node are able to transmit to the switch; and thus, the switch can transmit data from, or service, all of the node input links at one time.

In addition, preferably, the rate at which the switch transmits data to an output link is the same as the rate at which each input link transmits data to the switch —a property referred to as balanced input/output transmission rates. This property significantly simplifies the design and implementation of the link interface. Most existing network nodes do not have this property, and the rate at which data can be transferred via the node switch into the output side of a link is often much greater (for example, ten times or more greater) than the rate at which data can be transmitted over the individual links. As a result, these existing link interface designs can be very complex, especially for very high-speed links such as those that transmit data at a rate on the order of magnitude of gigabits/second.

With reference again to FIG. 2, each full-duplex link is considered as two directed links; and under normal operating conditions, data and control signals are transmitted in both directions over each full-duplex link. For a link to be operational, it is necessary that both directions of the link be operational—that is, it is necessary that the link be able to transmit data and signals in both directions. This is because the preferred programs or algorithms, discussed below, for routing and controlling the flow of data around the network and for controlling access to the network, require that data be transmitted in both directions over the network links. Thus, in case a link is not able to properly transmit data in one direction, the link is declared or considered to be faulty in that direction and in the other direction.

The transmission of data over the links of a network, referred to as traffic over the links, is regulated and controlled by mechanisms that use hardware messages or control signals. With reference to FIG. 5, these control signals are transmitted between the fairness controllers of the nodes, and the control signals are transmitted over the same physical medium—the links of the network—as are the data packets. The transmission of the control signals is transparent to the data packets, however; that is, it does not affect the contents of the data packets. The control signals can consist of, or be realized by, redundant or unused serial code words. One way to implement the transmission of a distinct control word is by using one of the unused serial code words of any code used on the network. For example, one known code used in communication networks is referred to as the 4B/5B code, and in this encoding scheme, every four bits of data are transformed into a code word of five bits. The unused code words in this encoding scheme can be used for transmitting control information from one node to its neighbor. The same also applies to other codes that contain redundant or unused code words. When the control signals consist of these codes words, each control word is short and, with reference to FIGS. 6 and 7, can be sent in the middle of a data packet in a manner that does not damage the data packet in which it is included.

Preferably, the control signals are transmitted in the direction opposite to the direction of transmission of the data packets whose transmission is being controlled by the control signals. Thus, a control signal would be transmitted from one node to another node to control the transmission of data packets from the latter node to the former node.

Access to network 10 is controlled by a procedure referred to as buffer insertion, which is a known, random, and distributed access technique to a communication network. With buffer insertion, a node can start to transmit a data packet to a link from the output buffer of the host interface only as long as all link buffers of the node are empty. If a node is transmitting a data packet from the output buffer of the host interface to a link of the network when another data packet arrives at the node via one of the links of the network, the transmission of the former packet will continue until completed; and in the meantime, the latter packet will be stored in the link buffer of the link over which the packet arrives. Once the transmission of the packet from the host interface is completed, though, the node will then transmit the packet from the link buffer, and the node will not be able to transmit any more data from the host interface until all link buffers are again empty.

With this procedure, network traffic—that is, the transmission of data at a node from one network link to another network link—has non-preemptive priority over node traffic that is to be entered into the network—that is, data that is to be transmitted to a link from the output buffer of the host interface of or at that node. Clearly, the buffer insertion access mechanism allows the concurrent access, or spatial reuse, of the network by more than one node; and since buffer insertion is always permitted, unless prevented by network traffic, there is no degradation in its efficiency as the band width or physical size increases. The allowance of concurrent transmission to the network over the full-duplex network does not guarantee that each node has a fair access to transmit packets to the network, however, since a first node can be prevented from transmitting data into the network if a second node continuously transmits data packets to the first node. Under extreme conditions, a node may be unable to transmit data into the network for a very long time—a condition in which the node is said to be starved. In view of this, a procedure, referred to as a fairness procedure or a fairness algorithm, may be used to insure that each node of the network has at least a minimum opportunity to transmit packets into the network.

Figure 9:
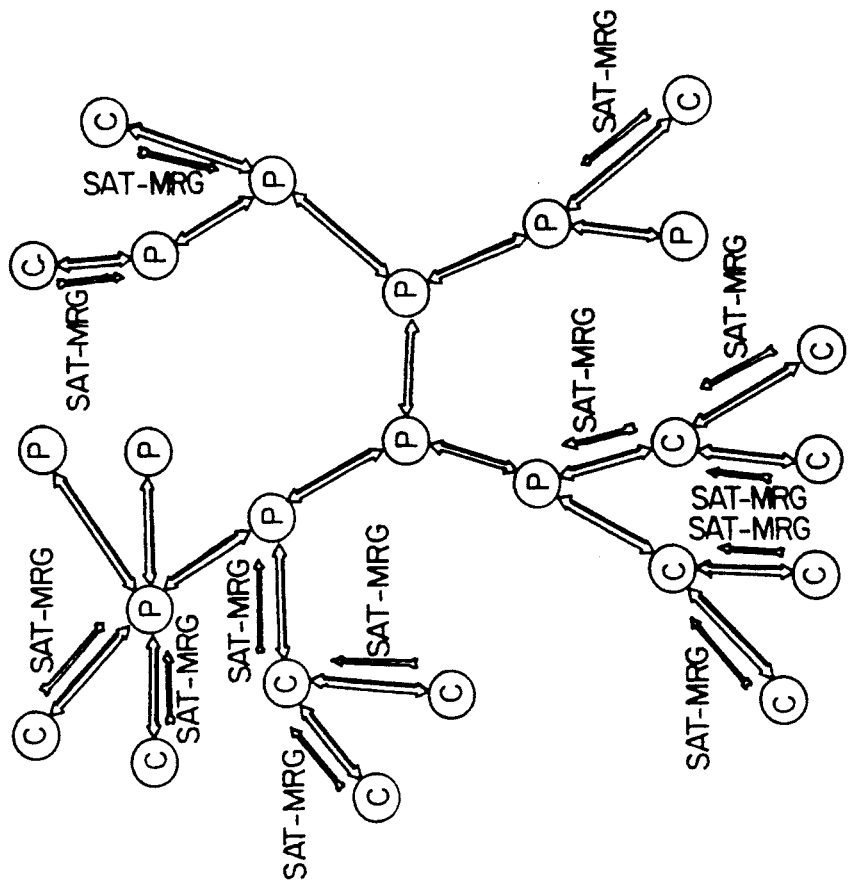
FIG. 9 illustrates the manner in which a second type of control signal is transmitted, or merges, over the network.
Figure 8:
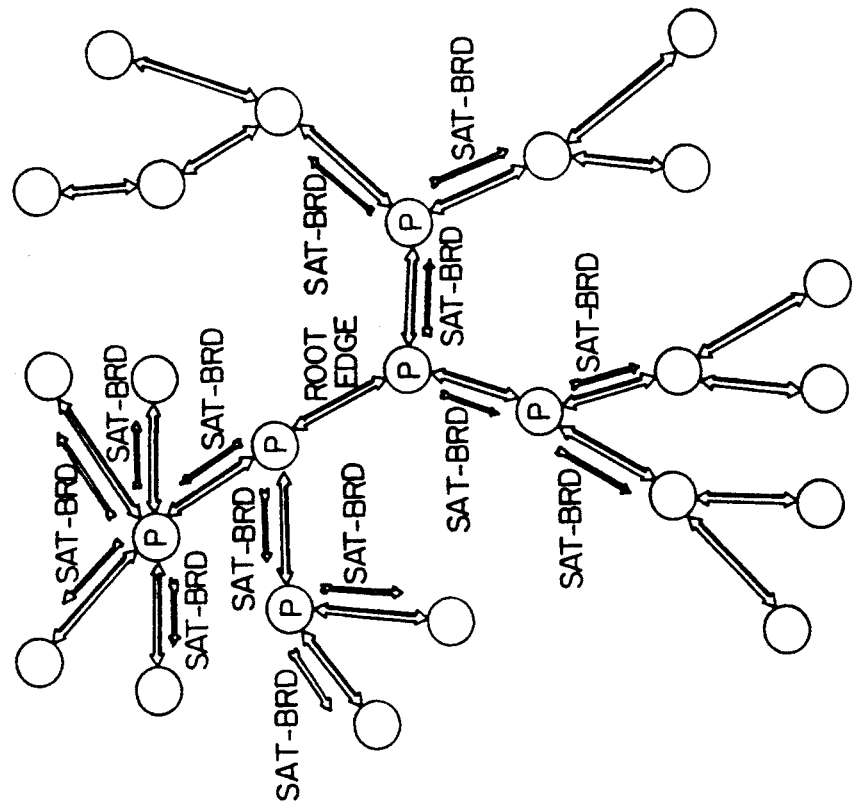
FIG. 8 illustrates the manner in which a first type of control signal is transmitted, or broadcast, over the network.

The preferred fairness algorithm of this invention is a two-phase cycle. In the first phase, referred to as the broadcast phase, a first signal, called a SAT-BRD signal, is transmitted from the root of the tree, downward through all of the nodes of the tree until the signal reaches the leaves of the tree, as generally illustrated in FIG. 8. In the second phase of the cycle, referred to as the merge phase, a second signal, called a SAT-MRG signal, is transmitted upward through the tree, from the leaves thereof, until the SAT-MRG signals all reach, or merge at, the root edge of the tree, as generally shown in FIG. 9. It should be noted that one signal may be used as both the SAT-BRD and SAT-MRG signals, and that this signal may be interpreted as either a SAT-BRD or a SAT-MRG signal depending upon its direction of travel through the tree, or on its time or place of origin.

Generally, a SAT-BRD signal provides the node receiving the signal with one or more numbers, referred to as a transmission quota or quotas, that indicate to the node how many data packets that node can transmit over each link connected to the node over a period of time, which is normally from the time the node receives the SAT-BRD signal to the next time the node receives a SAT-BRD signal. Each node transmits a SAT-BRD signal to each of its children if the node is satisfied on the link to its parent. A node is satisfied on a link if one of two conditions is met: i) if the node has no data packets to transmit over that link, or ii) if, since the last time the node received a SAT-BRD signal, the node has transmitted over the link the transmission quota given for that link in the last received SAT-BRD signal. If a node receives a SAT-BRD signal when it is not satisfied over the link to its parent, the node will normally hold that SAT-BRD signal until the node is satisfied over that link, and then, when satisfied, the node will transmit the SAT-BRD signal to its own children.

Figure 10:
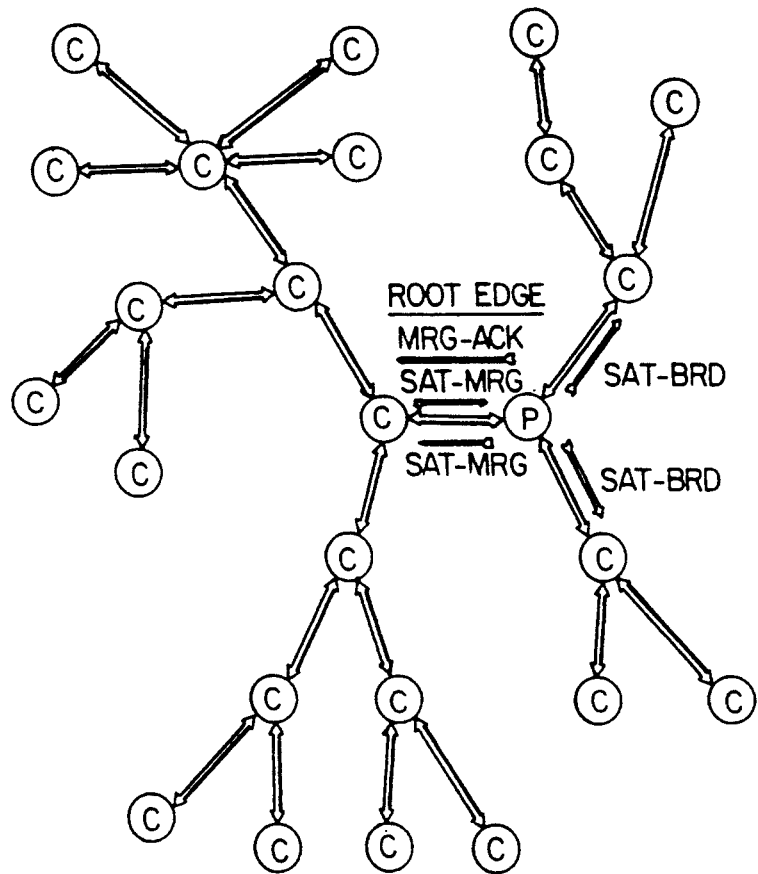
FIG. 10 generally illustrates the transmission of a third control signal between a pair of nodes of the network.

Each node normally transmits the SAT-MRG signal to its parent node if the former node is satisfied on all of the links to its own children nodes. Once the SAT-MRG signals all merge at one of the root edges of the tree, the two adjacent nodes on that root edge transmit a third signal, called a MRG-ACK signal to each other, as illustrated in FIG. 10. The transmission of these MRG-ACK signals initiates a new cycle, and in particular, the two nodes that receive the MRG-ACK signal start the broadcast of a new SAT-BRD signal over the tree.

The network interface of each node has three message queues, one for SAT-BRD messages, one for SAT-MRG messages, and one for MRG-ACK messages.

These messages are stored in these queues together with the names of the links on which they were received.

The following notation is used in the discussion of the preferred fairness algorithm, which is executed by the fairness finite state machine of each node.

$d^i$ represents the degree of node i, that is, the number of links connected to the node;

$\bar{L}^i$ is the vector of links connected to node i; that is, $\bar{L}^i = \{L^i_1, L^i_2, \ldots L^i_d\}$;

$L^{i\rightarrow}_{MRG}$ is a local variable that lists which node i has received SAT-MRG signals in the current broadcast-merge cycle;

$Q_{min}L^i_j$ is the minimum number, or quota, of packets that node i should send over link $L^i_j$ in order to be satisfied over that link;

$Q_{max}L^i_j$ is the maximum number, or quota, of packets that node i can send over link $L^i_j$ before receiving a new quota;

$qL^i_j$ is a local variable that counts the actual number of data packets that node i has sent over link $L^i_j$.

The above discussed maximum and minimum packet quotas are not necessarily the same; and moreover, both of these quotas can be changed dynamically in time or as a result of some established procedure.

Various conditions or states are relevant to or referred to in the fairness algorithm. First, each node is either in a satisfied condition or a not satisfied condition with respect to each link connected to the node; second, each node is either able or not able to transmit data over each of the links connected to the node; and third, each node is in one of two states, referred to as parent and child.

More specifically, node i is satisfied on link $L^i_j$ if, since the last time the node had received a control signal over that link, the node has sent at least $Q_{min}L^i_j$ packets on the link (that is, if $qL^i_j \geq Q_{min}L^i_j$), or if the link has no packets to send over the link $L^i_j$. If neither of these conditions is met, then node i is not satisfied on link $L^i_j$. Node i is able to send a packet over link $L^i_j$ if (i) that link is idle, and (ii) since the last time the node received a $Q_{max}L^i_j$ value for this link, the total number of data packets sent over the link by the node is less than $Q_{max}L^i_j$ (that is if $qL^i_j < Q_{max}L^i_j$).

A node enters the child state after forwarding a SAT-MRG signal to its current parent on the tree; and the node enters the parent state after forwarding SAT-BRD signals to all of its current children on the tree.

Furthermore, each node is provided with a timer 36 (shown in FIG. 3), symbolized by TIMER, which keeps track of various time periods, and the preferred embodiment of the fairness algorithm employs several time limits or bounds. A first type of time bound, referred to as global time bounds, relates to the length of time a node continuously stays in one state. In particular, there are two global time bounds, relating to the length of time a node continuously stays in the parent and child states, and these time bounds are represented by the symbol $T_p$ and $T_c$, respectively. More generally, the global time bound relating to the length of time node i continuously stays in the parent and child states are represented by the symbols $T^i_p$ and $T^i_c$, respectively. As a general rule, these time bounds may expire when two or more control signals are lost as they are being transmitted through the tree, and these time bounds insure that the SAT-BRD cycle will restart automatically even if two or more control signals are so lost. More specifically, when a global time bound for a node expires, the node will restart the fairness algorithm, will send the SAT-BRD signal to all of its neighbors, and if the node had been in the child state, the node will change to the parent state.

A second type of time bound, referred to as a local time bound and represented by the symbol $T_{link}$, is the maximum delay allowed at a node in transmitting a control signal from one node to its neighbors. This time bound is used to insure that the transmission of the SAT-MRG signals up a tree does not occur while the SAT-BRD signal is being transmitted over the tree, and thus insures that all of the independent broadcast phases will converge to a single merge phase within one cycle. The $T_{link}$ time bound also insures that, in case there is a failure of a control signal, the algorithm returns to a steady-state condition within one cycle after that failure occurs.

Figure 11:
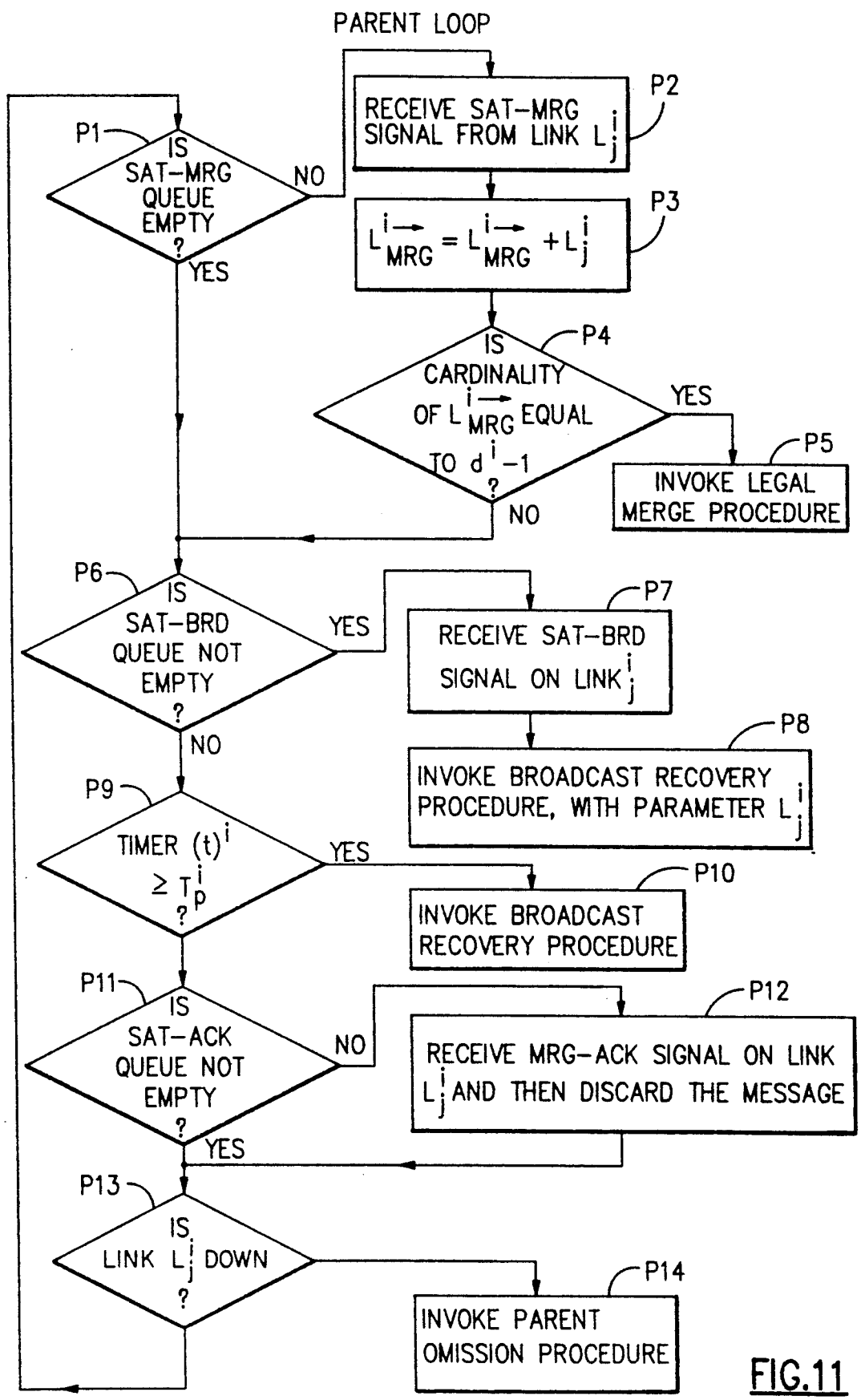
FIGS. 11 and 12(a) and (b) are flow charts showing two main programs or loops employed in the fairness algorithm used on the network.

FIG. 11 shows a first algorithm or program, referred to as the Parent loop. This algorithm is continuously performed by a node when that node is in the parent state, the node is part of a broadcast tree and is waiting, during normal operation, to receive the SAT-MRG signal from all of its children or subtrees. Generally, pursuant to this algorithm, when the control signals from all but one child are merged or received by the node, the node then changes its own state to the child state and transmits the SAT-MRG signal to that one node.

At step P1 at this algorithm, the SAT-MRG queue is checked to determine if it is empty. If that queue is not empty, then the SAT-MRG signal in the queue is received, at step P2, and the link, $L^i_j$, over which this signal arrived, is added to $L^{i\rightarrow}_{MRG}$, at step P3. At step P4, the cardinality of the new $L^{i\rightarrow}_{MRG}$ is compared to d-1. If the cardinality of $L^{i\rightarrow}_{MRG}$ is equal to d-1 (which means that SAT-MRG signals have been received from all but one of the neighboring nodes), then a subprocedure, referred to as the Legal Merge Procedure, is invoked at step P5. If at step P1, the SAT-MRG queue is empty, or if at step P4, the cardinality of $L^{i\rightarrow}_{MRG}$ is not equal to d-1, the program then checks to determine if any SAT-BRD signals have been transmitted to the node, which would indicate that an error has occurred. In particular, this is done, at step P6, by checking the SAT-BRD queue to determine if it is not empty. If it is not empty, the program then receives the waiting SAT-BRD signal, at step P7, and invokes a subprocedure referred to as the Broadcast Recovery Procedure at step P8, with a parameter identifying the link over which that SAT-BRD signal arrived.

If the SAT-BRD queue is empty at step P6, the program then checks, at step P9, to determine if a global timeout has occurred; and in particular, whether TIMER $(t)^i$ is greater than or equal to $T^i_p$. If such a timeout has occurred, the program also invokes the Broadcast Recovery Procedure at step P10. If the global timeout has not occurred, the program again checks, at step P11, to see if the MRG-ACK queue is not empty; and if it is empty, the node, at step P12, receives the MRG-ACK signal and then discards this message. At step P13, the program checks to determine if any link connected to node i has become inoperative, or gone down; and if any link has become inoperative, the program invokes a subprocedure referred to as the Parent Omission Procedure at Step P14. After checking all of the links of node i at step P13 and, as appropriate, invoking the Parent Omission Procedure at step P14, the program returns to step P1 and repeats the algorithm.

Figure 12A:
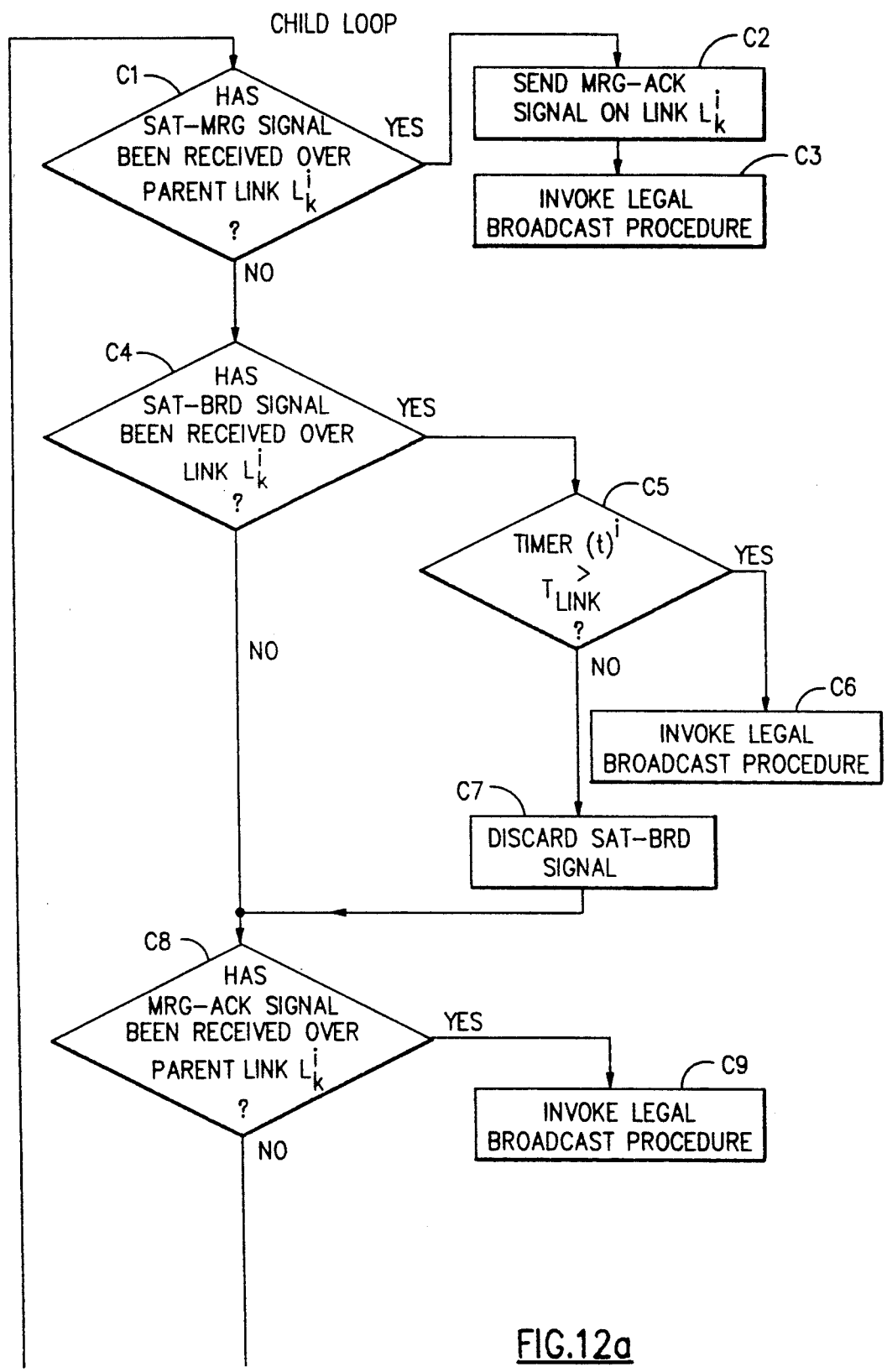
Figures 12, 12B:
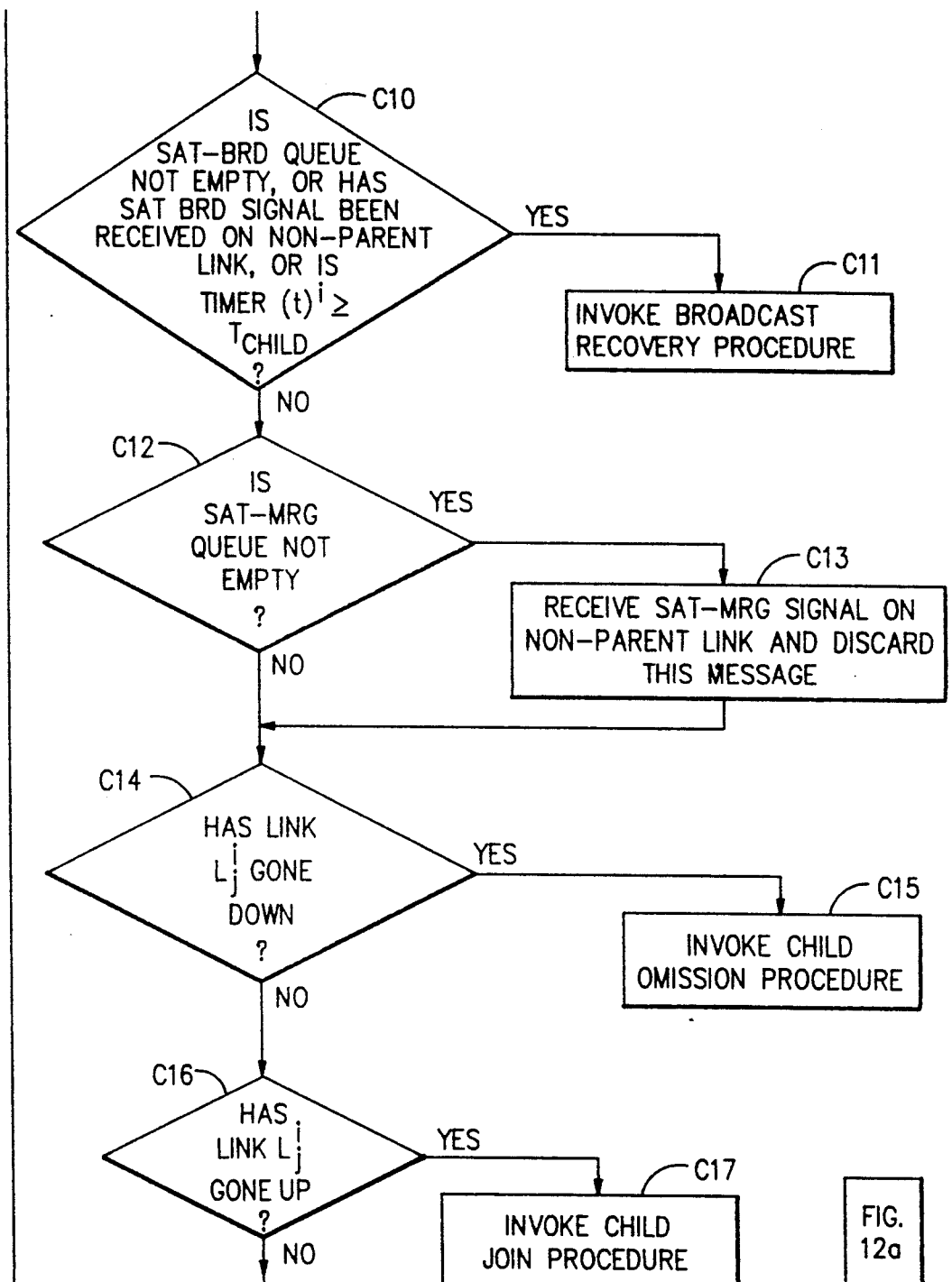

FIG. 12 illustrates a second main algorithm or program, referred to as the Child loop, and that is continuously performed by a node when it is in the child state. Generally, pursuant to this program, the node monitors its parent link (the link over which the last SAT-MRG signal was sent by the node), and the node waits for either a SAT-BRD signal, a SAT-MRG signal, or a MRG-ACK signal in order to change to the parent state.

More particularly, at step C1, the program checks to determine if it has received a SAT-MRG signal on its parent link, represented as $L^i_k$. If the node has received this signal on this link, the node, at step C2, sends a MRG-ACK signal on the parent link, and, at step C3, invokes a subprocedure referred to as the Legal Broadcast Procedure. When the MRG-ACK signal is sent over a link that is a root edge of the spanning tree, the merge phase ends and a new broadcast phase starts. If, at step C1, the SAT-MRG signal has not been received on the parent link, the program moves to step C4, and checks to determine if the SAT-BRD signal has been received on the parent link. If it has, the processor moves to step C5, which is to check whether a local timeout has occurred; that is, whether TIMER $(t)^i$ is greater than $T_{link}$. If this local timeout has occurred, then the processor invokes the Legal Broadcast Procedure, at step C6; but if this timeout has not occurred, then the SAT-BRD signal is discarded at step C7.

After step C7, or if at step C4 the SAT-BRD signal has not been received on the parent link, the program moves on to step C8. At this step, the program checks to determine if the MRG-ACK signal has been received over the parent link, $L^i_k$, and if it has, the Legal Broadcast Procedure is invoked at step C9. When the MRG-ACK signal is received over this link, the merge phase has terminated and a new broadcast phase should start. If, at step C8, the SAT-BRD signal had not been received on the parent link, the program moves to step C10, which is to test for several conditions. In particular, at step C10, the program checks to determine (i) if the SAT-BRD queue is not empty, (ii) if the SAT-BRD signal has been received on a non-parent link, or (iii) if a global timeout has occurred, that is, if TIMER $(t)^i$ is greater than $T_c$. All of these conditions indicate that a fault exists or that an error has occurred in the network; and if any of these conditions exist, then at step C11, the Broadcast Recovery Procedure is invoked.

If none of the faults or errors tested for at step C10 exist, then the program moves on to step C12, and the SAT-MRG queue is checked to see if it is not empty. If this queue is not empty, then the SAT-MRG signal in the queue is received and discarded at step C13. After step C12, or step C13 if the SAT-MRG queue is not empty, the program checks, at steps C14 and C16, to determine whether any link of node i has gone from an operative to an inoperative condition, or from an inoperative to an operative condition. If a link has become inoperative, a procedure referred to as the Child Omission Procedure is invoked at step C15; while if a link has changed from being inoperative to operative, a procedure referred to as the Child Join Procedure is invoked at step C17. After testing the links at step C14 and C16, the program returns to step C1.

Figure 13:
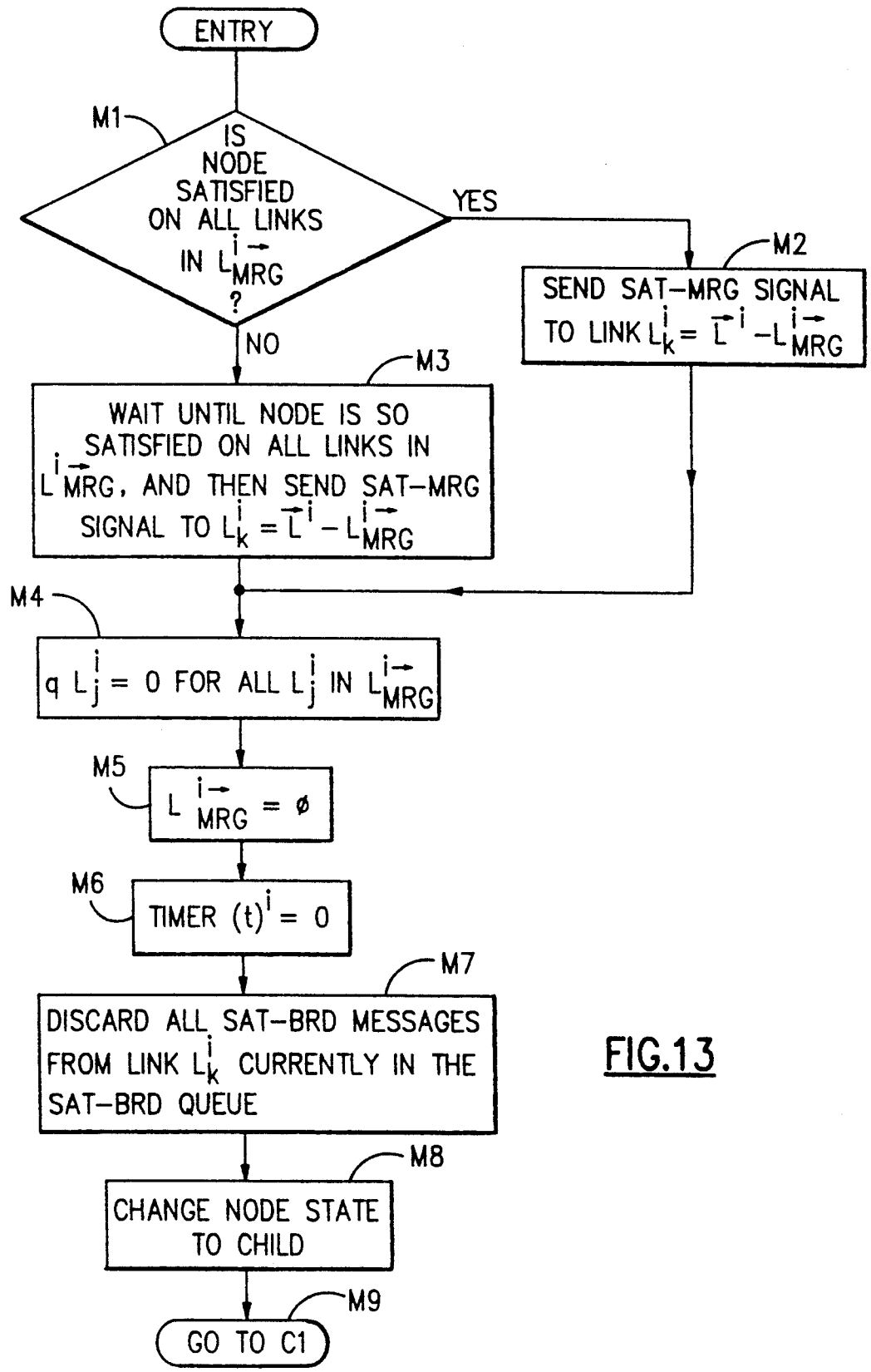
FIGS. 13–18 are flow charts showing seven subprograms or procedures that are also employed in the fairness algorithm.

The Legal Merge Procedure, shown in FIG. 13, is used for changing the state of a node from parent to child, to insure that the node is satisfied on the links to its children, and to send the SAT-MRG signals to the node's current parent node. More specifically, at step M1, the program checks to determine if the node is satisfied on all of the links in $L^{i\rightarrow}{}_{MRG}$. is, then at step M2, the SAT-MRG signal is sent over the link, $L^i_k$, that is in $\bar{L}^i$, but not in $L^{i\rightarrow}{}_{MRG}$. If, at step M1, the node is not satisfied on all links in $L^{i\rightarrow}{}_{MRG}$, then the program moves on to step M3, where the program waits until it is so satisfied, and then sends the SAT-MRG signals to link $L^i_k$ that is in $\bar{L}^i$, but not in $L^{i\rightarrow}{}_{MRG}$.

At step M4, the transmission quotas on all of the merged links—that is, the links over which the node has received the SAT-MRG signals—are reset to 0; at step M5, $L^{i\rightarrow}{}_{MRG}$ is set to the null set; and at step M6, the node timer is reset to 0. At step M7, all of the SAT-BRD signals from the parent link, $L^i_k$, currently in the SAT-BRD queue are discarded; and this is done because the merge phase has priority over the broadcast phase. At step M8, the state of the node is changed to the child state, and then, at step M9, the program proceeds to step C1 of the Child loop.

Figure 14:
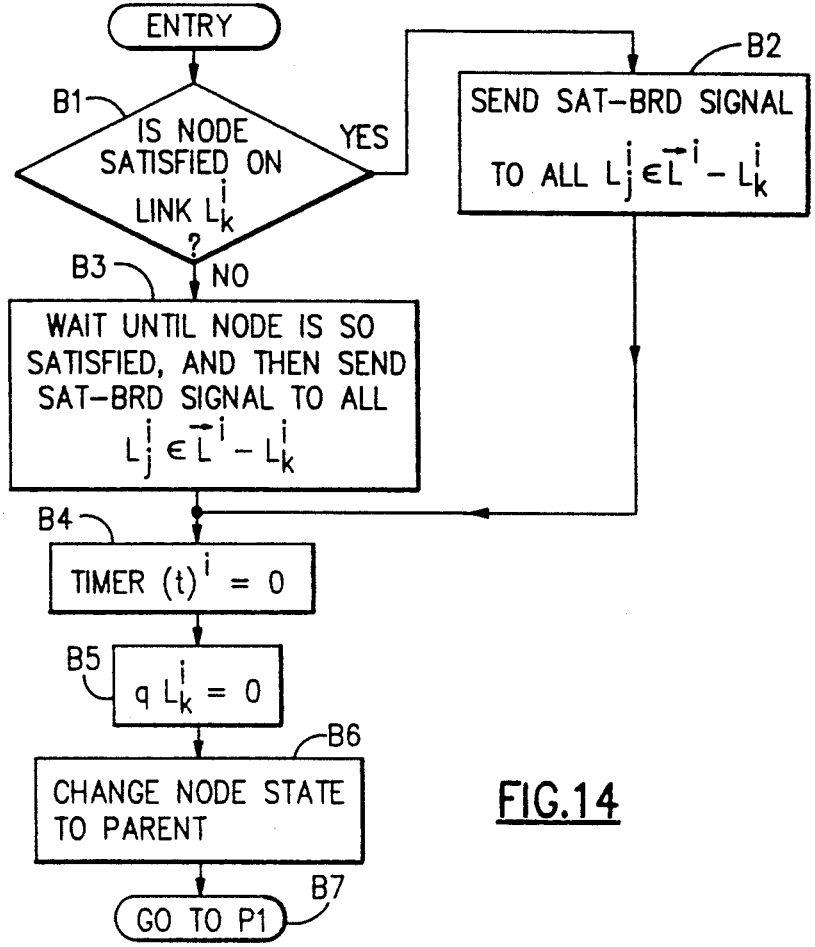

FIG. 14 shows the Legal Broadcast Procedure, which is used for changing the state of a node from child to parent and to insure that the node is satisfied on the link to its parent node. More specifically, at step B1, the program checks to determine if the node is satisfied on the link to its parent node; and if it is, the node then sends the SAT-BRD signal to all of its other links, at step B2. If at step B1, the node is not satisfied on its parent link, then the program moves on to step B3. Here the program waits until it is so satisfied; and once the node is satisfied, the SAT-BRD signals are then sent to all the links other than the parent link. After step B2 or step B3, as appropriate, the program moves on to steps B4, B5, and B6, where the node timer is reset to 0, the transmission quota on the parent link is reset to 0, and the state of the node is changed to parent, respectively. After this, at step B7, the program goes to step P1 of the Parent loop.

Figure 15:
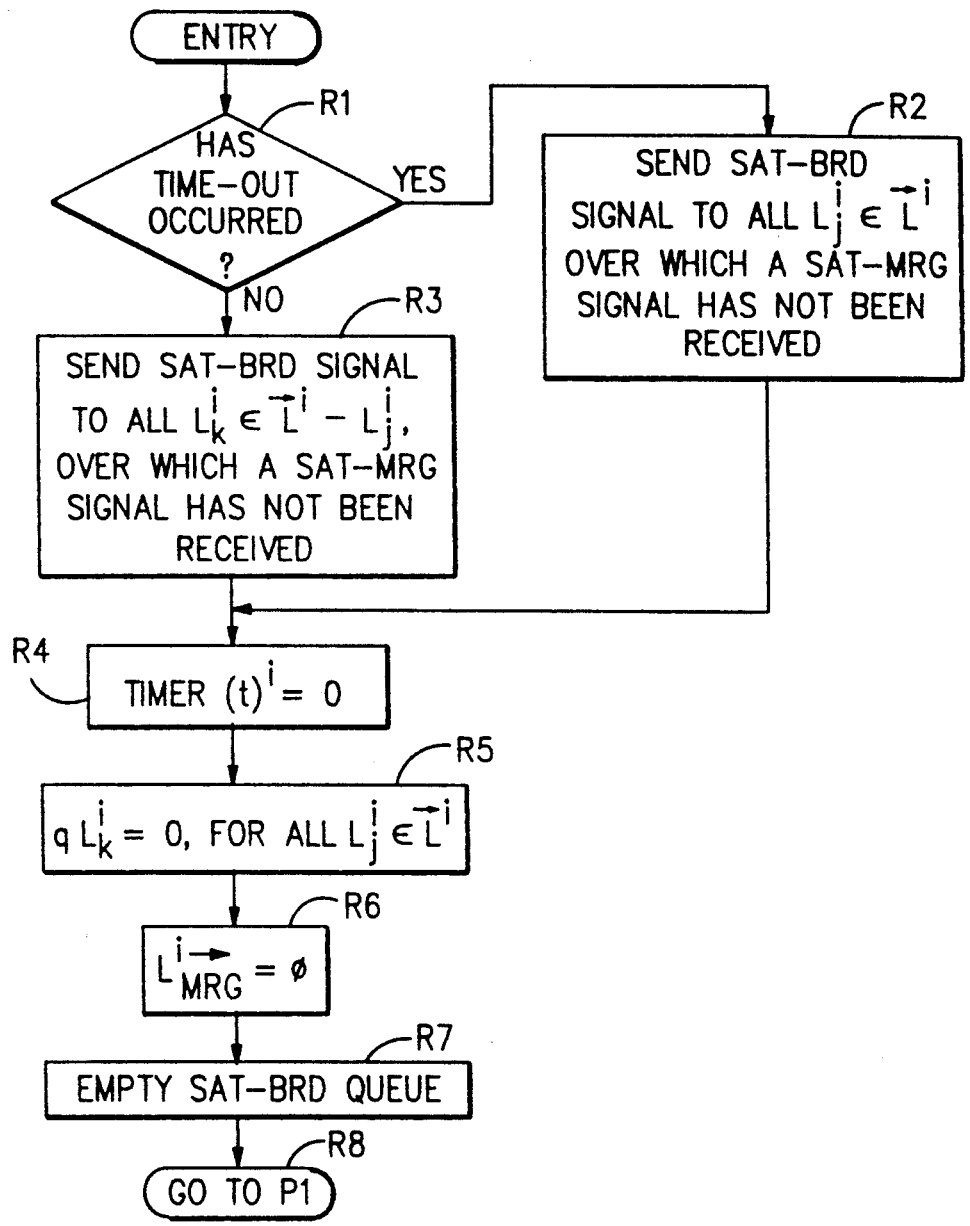

The Broadcast Recovery Procedure, shown in FIG. 15, is provided to insure that new broadcast phases are started despite the possible occurrences of faults or errors that, in the absence of the Broadcast Recovery Procedure, would prevent new broadcast phases from starting. This recovery procedure does not check for any satisfied conditions. In particular, at step R1, the program checks to see if a timeout has occurred; and if it has, the program then, at step R2, transmits a SAT-BRD signal to all links in the set of the vector $\bar{L}^i$ except those over which a SAT-MRG signal, currently in the SAT-MRG queue, has been received. If, at step R1, a time-out has not occurred, the program proceeds to step R3, at which SAT-BRD signals are sent to all the links in $\bar{L}^i$ except for link $L^i_k$ and except for those links over which a SAT-MRG signal, currently in the SAT-MRG queue, has been received. At step R4, the node timer is reset to 0; and at step R5, the transmission quotas are reset to 0 for all links in $\bar{L}^i$. In step R6, $\bar{L}^i_{MRG}$ is reset to the null set; and at step R7, the SAT-BRD queue is emptied. After this, at step R8, the program goes to step P1 of the parent loop.

Figure 16:
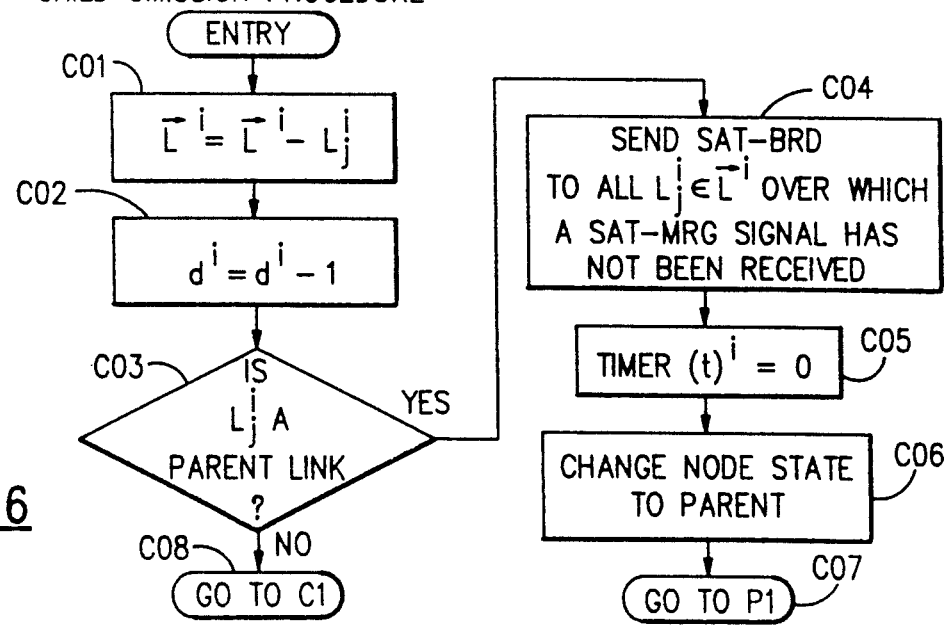

The Child Omission Procedure, shown in FIG. 16, is invoked by a node program when a link is detected as faulty or missing and the node is in the child state. This program insures that the omission of a link does not interfere with the normal operation of the fairness algorithm and that, if a tree becomes disconnected, each separate part of the tree will continue to perform the fairness algorithm independent of the other separate parts. At step CO1 of the Child Omission Procedure, $\bar{L}^i$ is reset to the former $\bar{L}^i$ minus the faulty link $L^i_j$; and at i step CO2, d is reset to a new value equal to the former value of d less 1. At step CO3, the program checks to determine if the missing or faulty link $L^i_j$, is a parent link. If it is, then, at step CO4, the SAT-BRD signal is sent to all the links in the vector $\bar{L}^i$ except those over which a SAT-MRG signal, currently in the SAT-MRG queue, has been received. Also, the node timer is reset to 0 at step CO5, the state of the node is changed to parent at step CO6, and at step CO7, the program then goes to step P1 of the parent loop. If, though, at step CO3, the faulty link is not a parent link, then, at step CO8, the program goes to step C1 of the Child loop.

Figure 17:
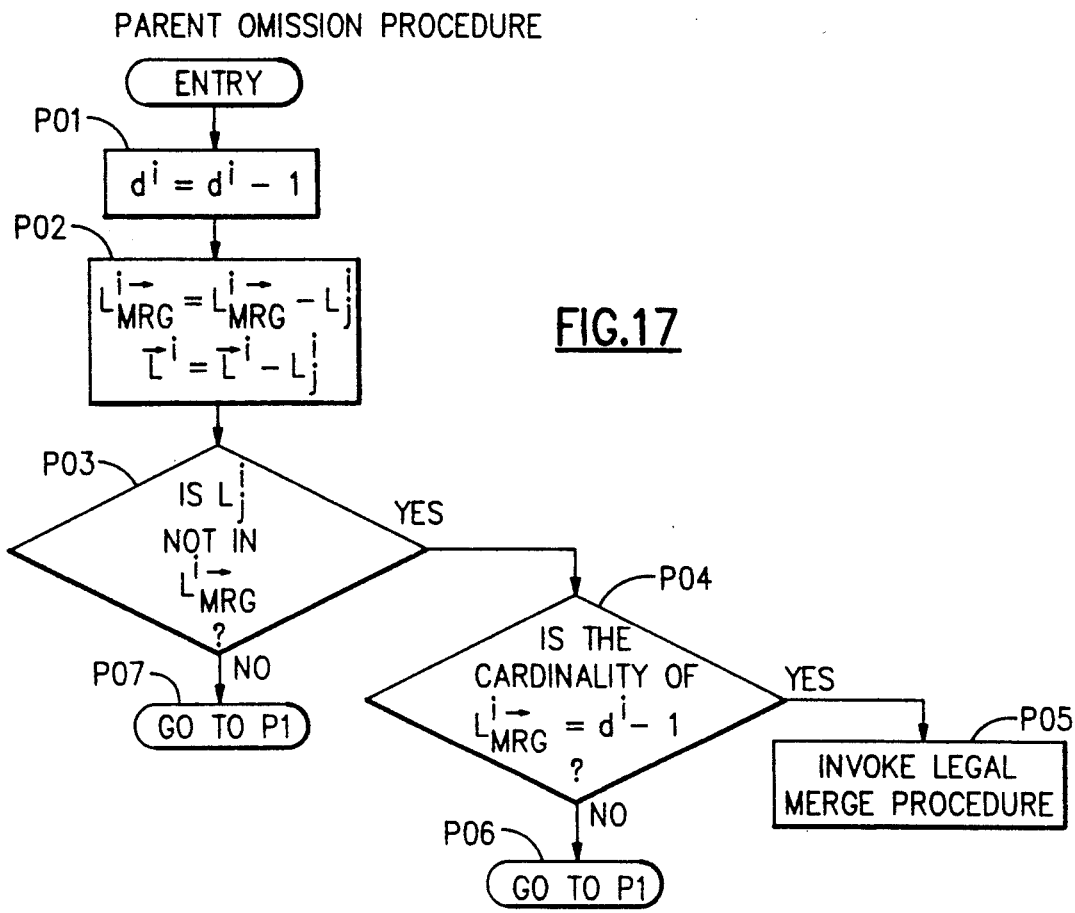

FIG. 17 illustrates the Parent Omission Procedure, which is invoked by a node when the node is in the parent state and a link is found to be faulty or missing. This program also insures that the omission of a link does not prevent normal operation of the fairness algorithm and that if a tree becomes separated, each separate part of the tree will continue to perform the fairness algorithm independently of the other tree parts. As a result of this procedure, the node can either return to the Parent loop or change to the child state via the legal merge procedure.

More particularly, at step PO1, d is reset to a new value equal to the old value of d minus 1; and at step PO2, the missing or faulty link, $L^i_j$ is removed from the vectors $L^{i \rightarrow}_{MRG}$ and $\bar{L}^i$. At step PO3, the program checks to determine if link $L^i_j$ is not in $L^{i \rightarrow}_{MRG}$. If it is not, the program proceeds to step PO4, which is to compare the cardinality of $L^{i \rightarrow}_{MRG}$ to d-1 If the cardinality of $L^{i \rightarrow}_{MRG}$ is equal to d-1, then the program invokes the Legal Merge Procedure at step PO5; however, if the cardinality of $L^{i \rightarrow}_{MRG}$ is not equal to d-1, then, at step PO6, the program goes to step P1 of the Parent loop. If, at step PO3, the link $L^i_j$ is not in the vector $L^{i \rightarrow}_{MRG}$, then, at step PO7, the program proceeds directly to step P1 of the Parent loop.

The Child Join Procedure is invoked when a link, $L^i_j$, previously declared faulty or missing, is declared operational, and this procedure is used to add the link to the series of links over which a node transmits and looks for control signals. The Child Join Procedure can be invoked, and thus a link can join the fairness algorithm, only when the node is in the child state. Moreover, the control signals will not be transmitted over this link until the next time the node is changed to the parent state.

Figure 18:
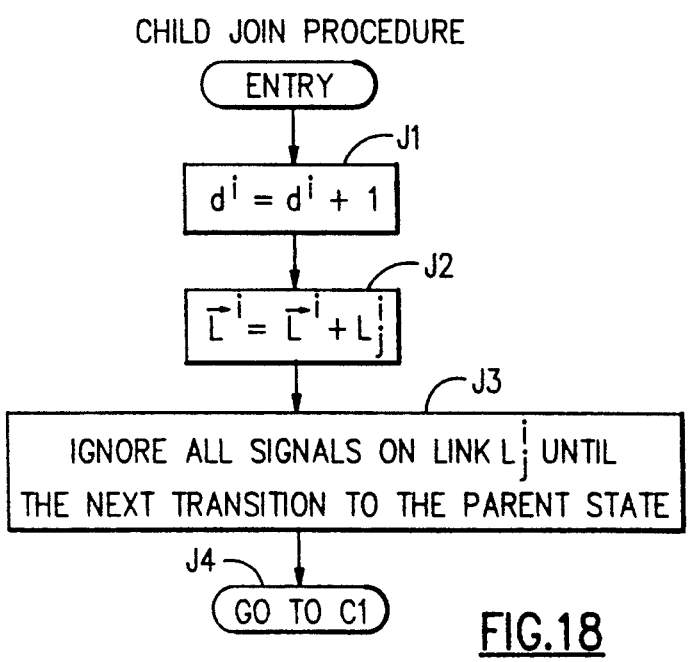

The Child Join Procedure is illustrated in FIG. 18. At step J1 of this procedure, the node degree is increased by 1; and at step J2, $L^i_j$ is added to the vector $\bar{L}^i$. The next step in the program, step J3, is simply to ignore all signals on the link until the node changes to the parent state; and at step J4, the program goes to step C1 of the Child loop. It should be noted that, because at step J3 all signals on the link are ignored, the link fully joins the node algorithm only during the next broadcast phase.

Figure 19:
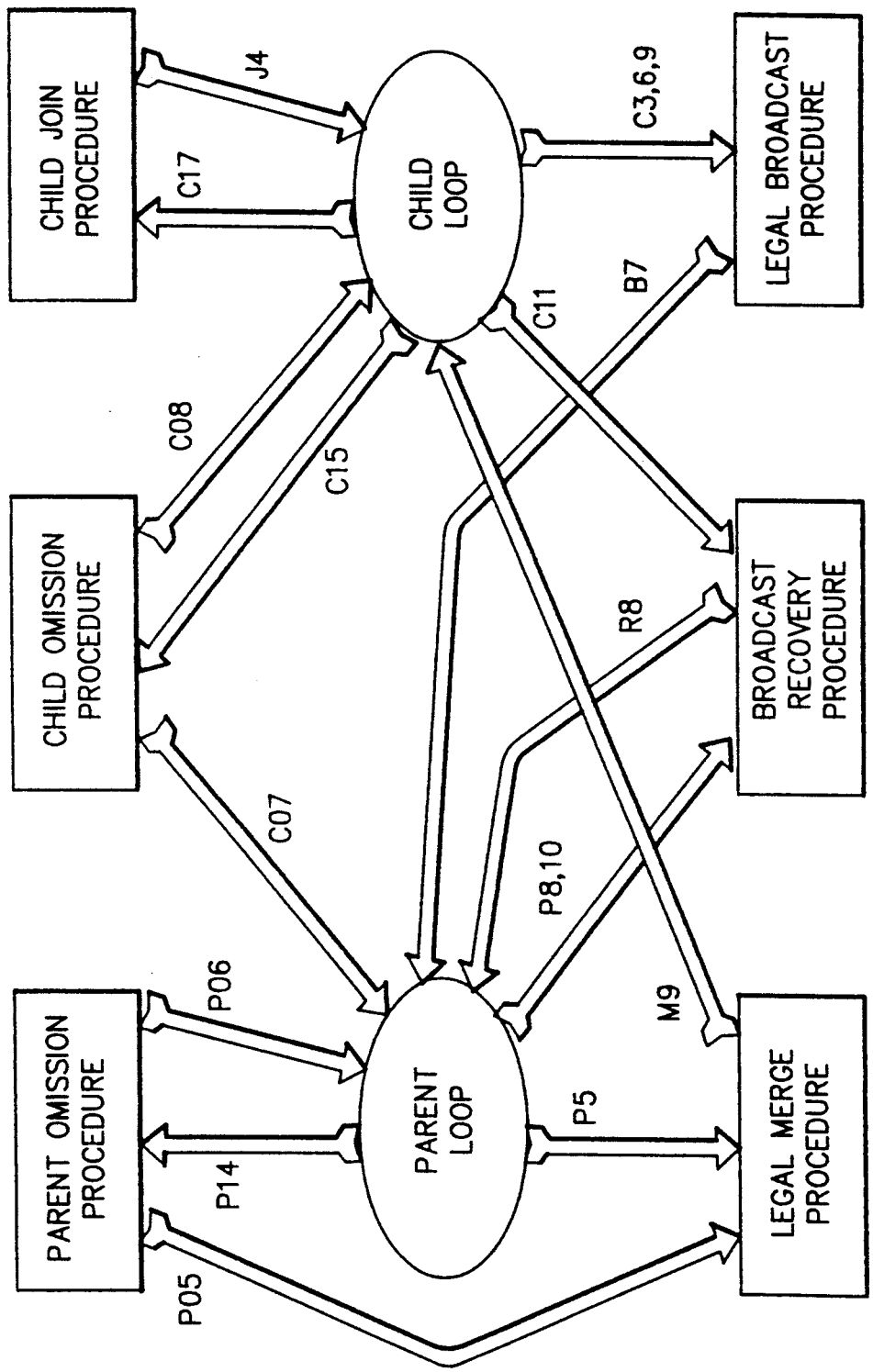
FIG. 19 diagrammatically illustrates interrelationships between the loops and procedures of FIGS. 11–18.

FIG. 19 generally illustrates the procedures that may be invoked by, or that may invoke, the Parent and Child loops, and the specific steps at which the procedures invoke or are invoked by those loops. For instance, the Child Join Procedure and the Broadcast Recovery Procedure are invoked by the Child loop at steps C17 and C11 respectively; and the Parent loop invokes the Legal Merge Procedure, the Broadcast Recovery Procedure, and the Parent Omission Procedure at steps P5, P8 and P10, and P14 respectively.

The fairness algorithm disclosed above has several important features. First, if a leaf node of a tree is in the child state when that node receives a SAT-BRD signal, the node will change to the parent state, and will then change back to the child state. This is result of the facts that each leaf node has only one link and will change its state to the parent once the node is satisfied on that one link, and this will always happen because the amount of traffic over each link in each control cycle is bounded by the transmission quota for that link. Further, a leaf node in the parent state always changes back to the child state because it has no children and it does not have to wait for any SAT-MRG signal. To elaborate, the cardinality of $L^{i \rightarrow}_{MRG}$ of the leaf node is always 0 (i.e., 1−1); and as a result, the Legal Merge Procedure is called and, since the leaf node is automatically satisfied, the node changes its state to the child state. A SAT-MRG signal is then sent on the link to the parent node, and the merge phase starts.

A second, very important feature of the fairness algorithm is that, if no failures occur and all of the SAT-MRG signals are transferred reliably, then the merge phase will terminate at two adjacent nodes; i.e., on the root edge of the tree. Also, these two nodes will, first, receive the SAT-MRG signal from one another, and second, will be in the child state when they receive these SAT-MRG signals. As a result, both of these nodes will broadcast SAT-BRD signals away from each other.

This advantage results from the fact that each node always forwards the SAT-MRG signal on the link over which it has not received the SAT-MRG signal. As a result, two adjacent nodes on a root edge that are ready to forward the SAT-MRG signal will send them to one another, and the broadcast phase will correctly start. Regardless of the order in which these two SAT-MRG signals are transmitted, the two end points of the root edge of the tree recognize the situation and broadcast the SAT-BRD signal outward from this root edge to the rest of the tree. These two root nodes also send the MRG-ACK signal to each other.

A third advantage of the fairness algorithm, which is immediately apparent from the structure of the tree itself, is that a broadcast phase that starts at the root edge of the tree will cover the entire tree, provided that no signal transmission failures occur.

A fourth, very important advantage of the preferred fairness algorithm is that a broadcast phase will not cross over a merge phase—that is, a broadcast signal cannot progress down a tree while a merge signal progresses up the tree. This is shown by the following discussion. A SAT-BRD signal is only sent over a given link at steps B2, B3, R2, R3, and CO4, with the provision that the SAT-MRG signal has not been received on that link. After a SAT-MRG signal is sent on a link (at step M2 or M3), all subsequent SAT-BRD signals received on that link are discarded for the duration of the time period $T_{link}$. At the end of this time period, the SAT-MRG signal reaches the other node, and thus insures that any later broadcast will cancel this SAT-MRG signal.

With the system of the present invention, a cycle that starts from the leaf nodes will continue to perform merge and broadcast phases, as long as there is no signal loss.

In addition, when the algorithm starts at an arbitrary point (for example, after previously stopping as the result of two or more control signals being lost in the same cycle), a merge phase will converge on a single root edge of the tree, and all the nodes of the tree will be in the child state. As a result of this, a normal operation of the broadcast and merge phases can continue immediately. This is the result of two mechanisms in the fairness algorithm: (i) if a single or multiple timeouts occur, the broadcast phase will cover the entire tree—that is, SAT-BRD signals will be sent to every node——and then a uniform merge phase will converge to the root edge of the tree, and (ii) if as a result of some faulty conditions, a merge and a broadcast phase are progressing on the tree at the same time, these phases will not cross one another, as discussed above. Furthermore, the merge phase stops the broadcast phase; and since all merge phases start from the leaves of the tree, if the algorithm does not stop the merge phase, that phase will continue until it converges to the root edge of the tree, and normal operation of the fairness algorithm will resume.

The fairness algorithm has a number of very advantageous properties. First, the algorithm insures equifair access to the tree links in each round or cycle; that is, each fault-free cycle gives an opportunity to every node to transmit its quota of packets on all the links connected to the node. Because of this, the transmission of data, or traffic, into the network is deadlock free, and a packet at the head of an output queue of a host interface will enter the network. Second, the merge phase will converge at a root edge in the network such that the delays on both subtrees of the network are equal. Moreover, the fairness algorithm can tolerate any single control signal loss in a cycle, and the algorithm will stop only if at least two control signals are lost in one cycle.

The fairness mechanism disclosed herein is a self-stabilized algorithm for fairness on a spanning tree. The algorithm is completely distributed and no node is designated as a root or a leader in the tree. This fact results in several highly desirable properties. First, the algorithm can tolerate any single loss of a control signal in every cycle; and, therefore, if the probability of a signal loss in a cycle of one millisecond is $10^{-6}$, then the probability that a cycle will be stopped as a result of two intermittent failures is $10^{-12}$, which gives a very long expected time between cycle interruptions. Second, even if a cycle interruption occurs that causes the tree to separate into components, each component of the tree will continue operation independent of the other separated components. In addition, the mechanism gives external flow control, which provides all of the nodes in the network with equal opportunity or fairness for accessing their adjacent links, and as an immediate result, deadlocks are automatically avoided.

The present invention may be used in a wide variety of specific applications, ranging, for example, from parallel architecture switches to local and wide area networks. In multi-stage switches, the present invention may be used to regulate access into the switch and to avoid congestion into the switch. Another application is to provide a fairness and flow-control mechanism in network architectures. A still further application is to provide real-time feedback from a network to an input rate control mechanism.

While it is apparent that the invention herein disclosed is well-calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method of regulating the transmission of packets in a communications network having a number of nodes, said number of nodes including a root node, a multitude of leaf nodes and a multitude of intermediate nodes, the nodes of the network being connected together to form a tree that is part of a general topology network, the method comprising:
   (a) transmitting a first control signal over said spanning tree from the root node to each of the other nodes of the network, the first control signal indicating to each of said other nodes a first number of data packets that said each of said other nodes is permitted to transmit in a corresponding time interval, each intermediate node transmitting the first control signal to another node in the network only when a first corresponding predetermined condition is satisfied;
   (b) transmitting a second control signal over the spanning tree from the leaf nodes, to the intermediate nodes and to the root node, each intermediate node transmitting the second control signal to another node in the network only when a second corresponding predetermined condition is satisfied; and
   (c) repeating step (a) only when the root node has received the second control signal from each of selected ones of the other nodes.

2. A method according to claim 1, wherein:
   the spanning tree forms a multitude of branches extending between the root node and the leaf nodes, each of said branches including at least a plurality of the nodes arranged in sequence along the branch;
   on each branch, each node next to another node on the branch in a first direction comprises a parent of said another node, and each node next to another node on the branch in a second, opposite direction comprises a child of said another node; and
   the first corresponding predetermined condition is satisfied when each intermediate node transmits to its parent node during the corresponding time interval, either a respective predetermined number of packets, or all packets said each intermediate node has to transmit to the child parent node.

3. A method according to claim 2, wherein the first predetermined condition is also satisfied upon the expiration of a predetermined length of time after said corresponding time interval.

4. A method according to claim 2, wherein the corresponding time interval for each intermediate node is the time between receipt by said each intermediate node of two consecutive first control signals.

5. A method according to claim 2, wherein the second corresponding predetermined condition is satisfied when each intermediate node has received from each of its children nodes either a predetermined number of packets, or all packets said each child node has to transmit to said each intermediate node.

6. A method according to claim 1, wherein each node of the network is capable of being the root nodes.

7. A method according to claim 1, wherein each node of the network initiates step (a) upon the occurrence of predetermined events.

8. A communication network, comprising:

a multitude of nodes for transmitting data packets between the network and a multitude of user stations and for routing the data packets around the network, the multitude of nodes including a root node, a multitude of leaf nodes and a multitude of intermediate nodes located between the root and leaf nodes; and a multitude of links interconnecting the nodes to transmit data packets and control signals therebetween, each of the links connecting together two of the nodes to transmit data packets and said control signals in first and second opposite directions between said two nodes, each of the nodes being connected to at least one of the links, and the links connecting the nodes together to form a spanning tree structure traversing each of the nodes of the network at least once, the spanning tree forming a multitude of branches extending between the root node and the leaf nodes, each of said branches including at least a plurality of the nodes arranged in sequence along the branch;

wherein on each branch of the spanning tree, each node next to another node on the branch in a first direction comprises a parent of said another node; and each node next to another node in the branch in a second, opposite direction comprises a child of said another node;

each of the nodes including means to start a two-phase control cycle, in a first phase of the control cycle, the root node transmits a first control signal over a part of the spanning tree; and in the first phase of the control cycle, each intermediate node of said part of the tree transmits the first control signal to each child node of said intermediate node after said each intermediate node receives the first control signal and a first corresponding predetermined condition is satisfied.

the first control signal indicating to each of the nodes on said part of the tree a first number of data packets that each of the nodes on said part of the spanning tree is permitted to transmit in a corresponding time interval, and in a second phase of the control cycle, each of the tree transmits a second control signal to a selected one of the other nodes of the tree to indicate completion of the first phase of the cycle.

9. A communication network according to claim 8, wherein:

in the second phase of the control cycle, each intermediate node of the tree transmits the second control signal to the parent of said each intermediate node when a second corresponding predetermined condition is satisfied.

10. A communication network according to claim 9, wherein:

the first predetermined condition is satisfied when said each intermediate node transmits to each child node thereof during the corresponding time interval either a respective predetermined number of packets, or all packets said each intermediate node has to transmit to said each child node.

11. A communication network according to claim 10, wherein the first predetermined condition is also satisfied upon the expiration of a predetermined length of time after said corresponding time interval.

12. A communication network according to claim 9, wherein the second predetermined conditions is satisfied when said each intermediate node of the tree has transmitted to the parent node thereof either a predetermined number of data packets, or all data packets said each intermediate node has to transmit to said parent node.

13. A communication network according to claim 12, wherein the second predetermined condition is also satisfied upon the expiration of a predetermined length of time after said corresponding time interval.

14. A communication network comprising:

a multitude of nodes for transmitting data packets between the network and a multitude of user stations, and for routing the data packets around the network; and a multitude of links interconnecting the nodes to transmit data packets and first and second control signals therebetween, each of the links connecting together two of the nodes to transmit data packets and said control signals in first and second opposite directions between said two nodes, the links connecting the nodes together to form a spanning tree structure traversing each of the nodes of the network at least once, each of the nodes being connected to at least one of the links;

each node including i) means to determine whether the first control signal has been transmitted to the node over a predetermined one of the links within a first corresponding time period; and (1) if the first control signal has been transmitted to the node over said predetermined one of the links within the first corresponding time period, to transmit the first control signal over each of the other links connected to the node, other than said predetermined one of the links, if the node has transmitted to each of said other links, during a second corresponding time period, either a respective predetermined number of data packets, or all data packets the node has to transmit to said each of said other links, and (2) if the first control signal has not been transmitted to the node over said predetermined one of the links within the first corresponding time period, to transmit the first control signal over all of the links connected to the node, and ii) means to determine whether the second control signal has been transmitted to the node over all but one of the links connected to the node within a third corresponding time period; and (1) if the second control signal has been transmitted to the node over all but said one of the links connected to the node during said third corresponding time period, to transmit the second control signal over said one of the links if the node has transmitted to said one of the links, during a fourth corresponding time period, either a predetermined number of data packets, or all data packets the node has to transmit to said one of the links, and (2) if the second control signal has not been transmitted to the node over all but one of the links connected to the node within the third corresponding time period, to transmit the first control signal over all of the links connected to the node.

15. A communication network according to claim 14, wherein the predetermined one of the links is the link over which the node last transmitted the second signal.

16. A communication network according to claim 15, wherein the said one of the links is the link over which the node last received the first signal.

* * * * *

UNITED STATES PATENT AND TRADEMARK OFFICE
CERTIFICATE OF CORRECTION

PATENT NO. : 5,245,609
DATED : September 14, 1993
INVENTOR(S) : Yoram Ofek, et al.

It is certified that error appears in the above-indentified patent and that said Letters Patent is hereby corrected as shown below:

```
    Column 2, line 28:   after "present" insert
--invention--

Column 7, line 10:   after "lists" insert --the
links from--
    Column 10, line 2:   before "is" insert --If it--
    Column 11, line 2:   delete "i"
    Column 14, line 48, Claim 2:  delete "child"
```

Signed and Sealed this

Nineteenth Day of July, 1994

*Attest:*

BRUCE LEHMAN

*Attesting Officer*      Commissioner of Patents and Trademarks